United States Patent Office 2,839,518
Patented June 17, 1958

2,839,518
MANUFACTURE OF POLYETHYLENE OF CONTROLLED MOLECULAR WEIGHT

Donald Lee Brebner, Wilmington, Del., assignor to E. I. du Pont de Nemours and Company, Wilmington, Del., a corporation of Delaware No Drawing. Application March 22, 1955
Serial No. 496,069

4 Claims. (Cl. 260—94.9)

This invention relates to methods for controlling the molecular weight of high density polyethylenes.

It has been known that ethylene can be converted to solid polymers under very high pressures in the presence of initiators which are capable of yielding free radicals. The solid polymers of ethylene obtained from such processes are not linear hydrocarbons as would be expected from the chemistry of vinyl polymerization but in their formation undergo side reactions which introduce chain branching and unsaturation into the polymer chain structure. Methods have recently been developed for making substantially unbranched linear polyethylenes. The latter material, as has recently been disclosed (British Patent 682,420), is characterized by greater stiffness and higher density than polyethylene heretofore produced commercially. Polyethylene obtained by these newer methods contains less than one methyl chain per 200 carbon atoms. Among these newer methods are those which are based on initiator systems obtained by admixing a compound of titanium or zirconium, preferably one in which the said metals are attached to groups such as —H, —hydrocarbon, —oxyhydrocarbon, —halide, or any combination thereof, with an organo-metallic reducing agent as the second component. Outstanding examples of the first component are $TiCl_4$, $TiCl_3$, $Ti(O-hydrocarbon)_4$ $Ti(O-hydrocarbon)_3$. Outstanding examples of the second component are metal alkyls, alkenyls and acetylides, such as lithium aluminum ethyl cyclohexenyl, metal hydrides such as lithium hydride and sodium borohydride, Grignard reagents such as phenyl magnesium bromides, and alkali and alkaline earth metals such as sodium and lithium. This type of initiator has been called a "coordination" initiator, because it is believed that the titanium component of the initiator is reduced to a valence state below three by the second component. The reduced titanium is believed to then coordinate with ethylene to form a chain-generating nucleus which is capable of adding monomer units to the originally coordinated ethylene. Coordination activity has been found in general with transition elements of the groups IIIb, IVb, Vb, and VIb of the periodic table.

One of the problems encountered in the development of processes based on the coordination initiator system is the problem of controlling the molecular weight of the product. In the absence of any control these processes frequently produce polymer of a molecular weight so high and a melt flow so low, as to preclude the use of the polymer in many important applications. The melt flow of the polymer at a given melt temperature is believed to be determined by the molecular weight of the polymer, e. g. a polymer with a higher molecular weight being less fluid than one with a lower molecular weight. A standard measure of the melt flow of the polymer is the melt index test, described in detail in ASTM-D-1238-52-T. This test is widely used to distinguish melt flow properties of ethylenic polymers and is therefore used as such in the process of this invention. Commercial solid polyethylenes in general fall within a melt index range of 0.2 to 3. Some of the methods which have been tried to control molecular weight within the desired melt index range have involved employing elevated temperatures and pressures, and a homogeneous system of monomer and polymer in the reaction medium. These latter methods were quite satisfactory but they required limiting the reaction conditions in a way which placed restrictions on catalyst activity, solubility of the components in the reaction mixture, etc. One of the major advantages of the coordination initiator system is that it is capable of polymerizing ethylene to high molecular weight polymers at room temperatures and atmospheric pressure under which conditions the polymer is not soluble in liquid hydrocarbons. In order to permit use of such favorable operating conditions it is therefore desirable to provide new methods for controlling the molecular weight of the polymer.

It has now been discovered in accordance with this invention that in the preparation of linear polyethylene having a density within the range of 0.95 to 0.98 wherein the polymerization is carried out in the presence of an inert liquid hydrocarbon medium at temperatures from 20 to 100° C. and in the presence of an initiator system comprising a titanium halide and a lithium aluminium tetraalkyl, the melt index of the resulting polyethylene may be controlled to give polymers having melt index values from 0.00 to 1.0 by controlling the ratio of the coordination metal compound to the reducing agent from 2 to 4.5 and by continuing the polymerization until the initiator is exhausted.

Although the nature of the reaction that occurs between the initiator components such as titanium tetrachloride and lithium aluminum tetraheptyl to form the active initiating complex is not known at the present time it has been found that the ratio of the coordinating metal compound to the reducing agent when increased to above two has a profound effect on the molecular weight of the polymer. Taking the titanium tetrachloride, lithium aluminum tetraheptyl catalyst system as an illustration it has been found that when an initiator ratio of two and below two is employed the melt index of the polymer produced throughout the reaction is zero, indicating an extremely high molecular weight polymer having essentially no melt flow. However by increasing the coordination metal compound to reducing agent ratio only slightly above 2, namely 2.5, the melt index of the polymer as the polymerization progresses decreases from 10 at the start of the polymerization to 0.05 at the end of the polymerization. As the ratio is increased to 4.5 the melt index of the polymer decreases from a value of 80 at the start of the polymerization to a value of one at the end of the polymerization when the catalyst has become inactive. As stated hereinabove the coordination initiators when used at a coordination metal compound to lithium aluminum tetraalkyl ratio of below two gives rise to such tremendously high molecular weight polymers, which have little or no melt flow and therefore a melt index value of zero, that for many commercial applications, utilization of the polymer is difficult. At an initiator ratio of above two to a ratio of 4.5, however, the molecular weight of the polymer is controlled to give polymers having a melt flow useful for most practical applications of the polymer, e. g. melt index values in a range of 0.00 to 1. A polymer having a melt index of a value higher than one up to a value of 80 may be obtained by stopping the reaction prior to completion. Such a procedure however decreases the efficiency of the catalyst system. An increase of the initiator ratio to above 4.5 will result in only slight further increase in the melt index of the polymer and is therefore preferentially avoided.

The present invention is applied to polymerizations of ethylene carried out at low temperatures and pressures as compared to the previously known high temperature and high pressure free radical polymerizations of ethylene to high molecular weight solid polymers. By low pressures and temperatures is meant pressures from atmospheric to 10,000 p. s. i. and by low temperatures is meant temperatures from 20 to 100° C. Under such conditions polymerization of ethylene when carried out in an inert hydrocarbon medium gives rise to a polymer medium slurry. Some of the methods known heretofore which control the molecular weight of the polymer, such as the reaction temperature, are not satisfactory at the slurry process conditions, outlined hereinabove, since the formation of a polymer solution is required. It is to be understood that the control of molecular weight obtained by means of variation of the ratio of the catalyst components, although most effective at the conditions outlined above, is not necessarily limited to these conditions. The effect of excess titanium tetrahalide persists at elevated temperatures and pressures, but in the latter conditions temperature is also an important determinant of molecular weight and is the preferred variable to use in controlling the melt index of the product.

Initiator components which have been found to be particularly adaptable to the process of this invention as employed for the low pressure-low temperature polymerization are coordination initiator systems comprising titanium tetrahalide and lithium aluminum tetraalkyls. The initiator components are preferably employed in the form of solutions in an inert liquid hydrocarbon which can also serve as the reaction medium for the polymerization. Of the titanium tetrahalides, titanium tetrachloride is preferred. The lithium aluminum alkyls useful in the present invention are lithium aluminum alkyls such as lithium aluminum tetra(n-butyl), lithium aluminum tetra(n-octyl) and lithium aluminum tetra(ethylcyclohexenyl). The inert organic solvents useful in the process of this invention are saturated hydrocarbon liquids such as cyclohexane and n-heptane or aromatic solvents such as benzene, toluene and xylene. The polymerization process is preferably carried out in the absence of moisture.

The invention is further illustrated by the following example.

*Example.*—Into 3-liter reaction flask equipped with a stirrer, reflux condenser, gas inlet means and means for withdrawal of unreacted gas, was placed two liters of dry cyclohexane. Titanium tetrachloride was added to the cyclohexane in quantities as shown in the table hereinbelow. The reaction flask was flushed with dry nitrogen and then with ethylene, lithium aluminum tetra(n-heptyl) in quantities shown in the table below was then introduced into the reaction mixture. The reaction mixture was heated to 50° C. and ethylene was introduced at atmospheric pressure into the reaction mixture. A polymer slurry formed and polymerization was continued until no further polymerization took place. Polymer samples were removed from the reaction mixture at regular intervals during the reaction and their melt indices were measured. The overall polymer formed was then separated from the reaction mixture, washed and dried. The melt index of the residual polymer was determined. Those polymers having a melt index too low to measure were subjected to inherent viscosity measurements using decahydronaphthalene as the solvent, so as to obtain a measure of molecular weight. For a series of initiator ratios the following results were obtained:

TABLE I

| Run | 1 | 2 | 3 | 4 | 5 | 6 |
|---|---|---|---|---|---|---|
| TiCl₄ moles×10⁻⁵ | 1 | 3 | 4 | 6.25 | 8.75 | 11.25 |
| LiAl (heptyl)₄ moles×10⁻⁵ | 2 | 2 | 2 | 2.5 | 2.5 | 2.5 |
| Molar ratio of TiCl₄/LiAlR₄ | 0.5 | 1.33 | 2.0 | 2.5 | 3.5 | 4.5 |
| Yield, gr | 120 | 40 | 34 | 145 | 140 | 130 |
| Melt Index: | | | | | | |
| 10% completion of reaction | 0.00 | 0.00 | 0.00 | 10 | | |
| 20% completion of reaction | 0.00 | 0.00 | 0.00 | | 75 | 80 |
| 50% completion of reaction | 0.00 | 0.00 | 0.00 | 2.5 | 4.0 | 6 |
| 100% completion of reaction | 0.00 | 0.00 | 0.00 | 0.05 | 0.5 | 1 |
| Inherent viscosity | 12.5 | 8.5 | 8.0 | | | |

The polymers produced by the present invention are linear solid polymers and are not low molecular weight oily polymers obtained by Friedel-Crafts type initiators. The polymers obtained by the present process are distinguishable from prior art commercial polymers by their higher densities of 0.95 to 0.98. The molecular weight control as exercised by the ratio of the initiator components is not limited to the polymerization of ethylene but may be equally well applied to polymerizations of ethylenically unsaturated hydrocarbon monomers such as propylene, butene, styrene and others. Similarly the copolymerization of ethylene with such monomers as propylene, isobutylene, butene, and styrene may be subjected to the same molecular weight control if it is desired to do so.

The present invention has been described with reference to lithium aluminum tetraalkyls as the reducing agent of the initiator system. Other compounds having metal to hydrocarbon bonds such as the alkali and alkaline earth metal alkyls or alkenyls or alkali metal acetylides may also be employed in the present process. The initiator ratios at which the molecular weight control is exercised with these metal alkyls may, however, vary slightly from the initiator ratios employed with the preferred lithium aluminum tetraalkyl.

The use of the present invention does not preclude the use of any other molecular weight control of the polymer polymerized under the conditions outlined hereinabove. As a matter of fact in certain polymerizations it may be of advantage to combine one or more methods of molecular weight control to obtain the optimum results of molecular weight, physical conditions of polymerization, polymerization rate and polymerization yield. Thus the use of small quantities of hydrogen and oxygen in the monomer stream to create optimum control may be used in combination with the control exercised by excess titanium tetrahalide.

The quantities of the catalyst components used in the present process may be varied over a wide range and to a certain degree are dependent on the temperature and pressure employed in the polymerization. However in general from 0.5 to 5% of the titanium compound by weight of the ethylene monomer used are sufficient to create high rates of polymerization. The quantities of the reducing agent are adjusted accordingly to correspond to the molar ratio desired for the polymerization.

The products obtained in the practice of this invention are highly valuable in the manufacture of films, molding powder, fibers, extruded wire coverings, etc.

I claim:

1. In the process of polymerizing ethylene to linear homopolymers having a density within the range of 0.95 to 0.98 in the presence of an inert liquid hydrocarbon medium at temperatures of 20 to 100° C. with an initiator system comprising a titanium halide and a lithium aluminum alkyl, the steps which comprise charging a quantity of initiator being less than 5 weight percent of the ethylene charged, said initiator containing titanium to lithium aluminum alkyl in an equivalent weight ratio of 2 to 4.5, continuing the polymerization until the catalyst loses activity, and thereafter separating from the polymerization mixture an ethylene homopolymer, said homopolymer having a melt index as determined by ASTM-D-1238-52-T of 0.00 when said ratio is 2 and a melt index of 1.0 when said ratio is 4.5, the melt index and said ratio being interdependent.

2. Process of claim 1, performed at 50° C. and a pressure of 1 to 5 atmospheres.

3. The process of claim 1 wherein the initiator system comprises titanium tetrachloride and lithium aluminum tetra heptyl.

4. The process of claim 1 wherein the inert organic medium is cyclohexane.

References Cited in the file of this patent
UNITED STATES PATENTS 2,721,189    Anderson _____ Oct. 18, 1955